United States Patent [19]

Sumi et al.

[11] 4,141,065
[45] Feb. 20, 1979

[54] ELECTRIC CONTROLLER SYSTEM WITH BUMPLESS TRANSFER

[75] Inventors: Akira Sumi; Koju Kataoka, both of Tokyo, Japan

[73] Assignee: Yokogawa Electric Works, Ltd., Tokyo, Japan

[21] Appl. No.: 838,068

[22] Filed: Sep. 30, 1977

[30] Foreign Application Priority Data

Oct. 8, 1976 [JP] Japan .................................. 51-120991

[51] Int. Cl.$^2$ ........................ G06F 15/46; G05B 7/00; G06J 1/00
[52] U.S. Cl. .................................... 364/115; 318/591; 340/347 AD; 340/347 SH; 364/118; 364/602
[58] Field of Search ............... 364/114, 115, 118, 119, 364/600, 601, 602, 607, 608, 107; 340/347 NT, 347 SH, 347 AD; 318/591

[56] References Cited

U.S. PATENT DOCUMENTS

| | | | |
|---|---|---|---|
| 3,387,282 | 6/1968 | Jacques | 364/115 X |
| 3,694,633 | 9/1972 | Lejon | 364/115 |
| 3,789,199 | 1/1974 | Kotwicki | 364/602 |
| 4,009,372 | 2/1977 | Przybylski | 364/115 X |
| 4,035,620 | 7/1977 | Hobbs et al. | 364/115 |

Primary Examiner—Joseph F. Ruggiero
Attorney, Agent, or Firm—Parmelee, Johnson, Bollinger & Bramblett

[57] ABSTRACT

An electric controller system includes a comparator at the input of a processor, the processor including a program memory, an operation control unit and a data memory. A digital/analog converter is provided at the processor output. Analog/digital conversion is by means of a loop including the processor, digital/analog converter and comparator. The digital/analog output is also received by an analog signal hold means, the output of which is fed back to the comparator. A manual control circuit operable only in a manual control mode provides an alternative input to the analog signal hold means. Computations in the processor are thus based on a manual input through the hold circuit and comparator only during the manual control mode. Bumpless switching from the manual mode to an automatic mode is provided while further providing for a manual output with failure of the processor. Further embodiments include a multiplexer at the input, a plurality of hold circuits and parameter setting circuits at the input.

10 Claims, 15 Drawing Figures

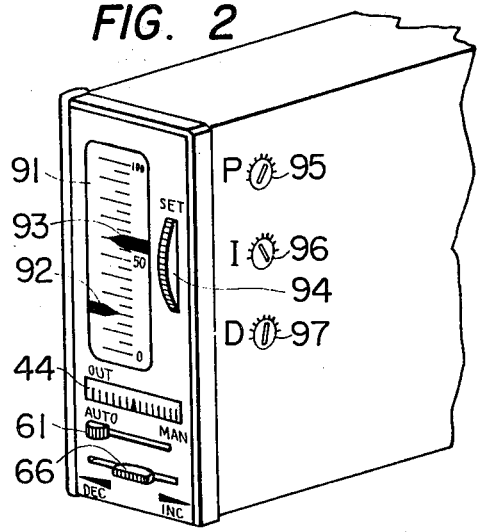
FIG. 2
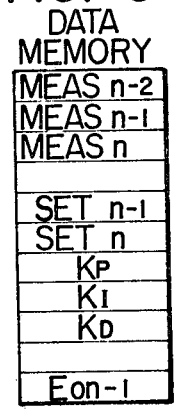
FIG. 5
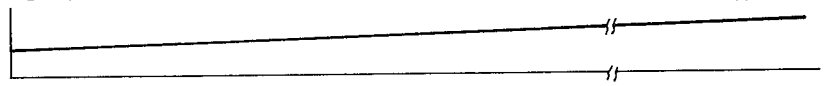
(a) MEASUREMENT SIGNAL    FIG. 3
(b) SAMPLING CLOCK SIGNAL
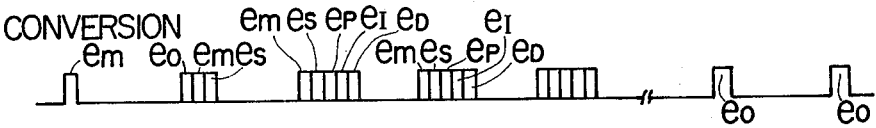
(c) A/D CONVERSION
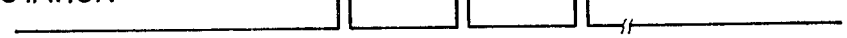
(d) COMPUTATION
(e) TO D/A CONVERTER
(f) OUTPUT INSTRUCTION SIGNAL
(g) OUTPUT SIGNAL
———— AUTOMATIC CONTROL MODE ———— | MANUAL CONTROL MODE

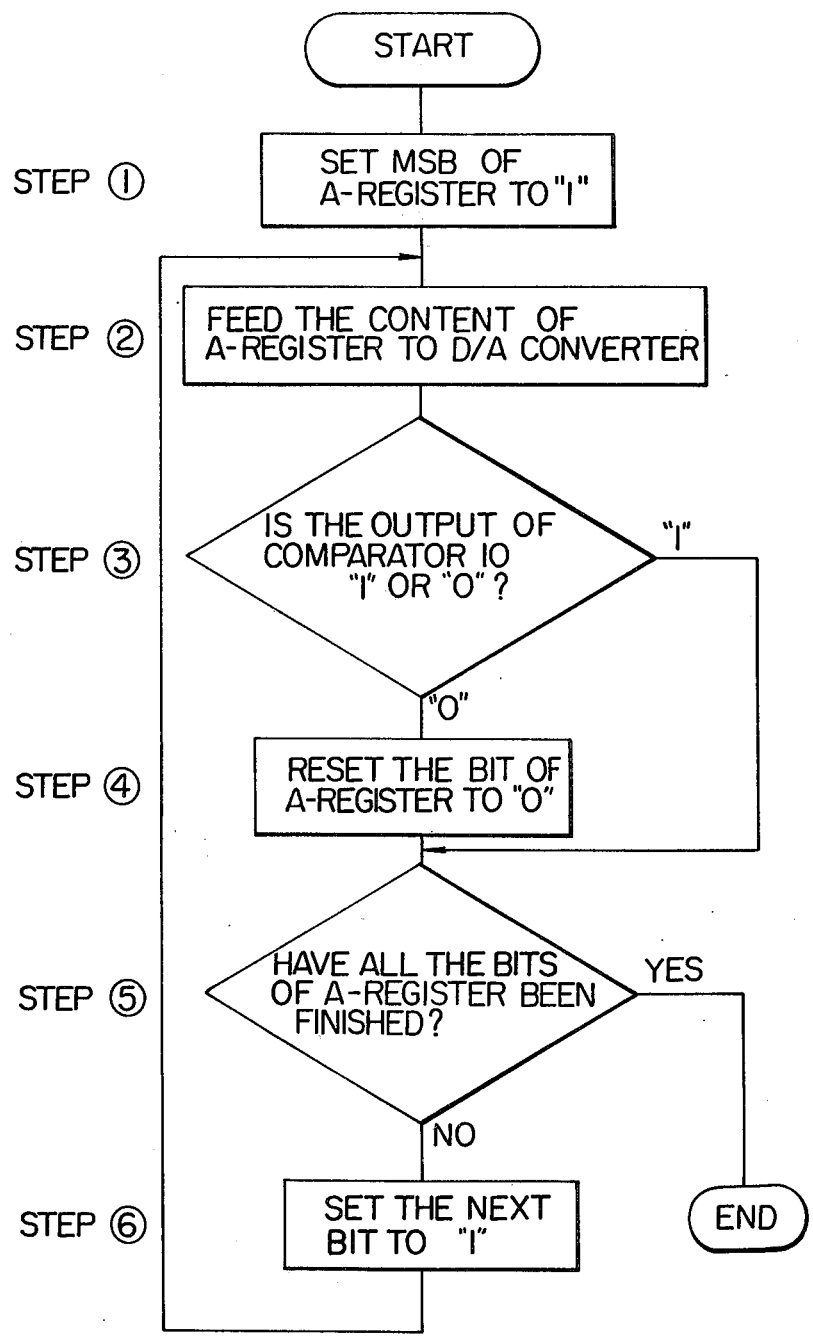

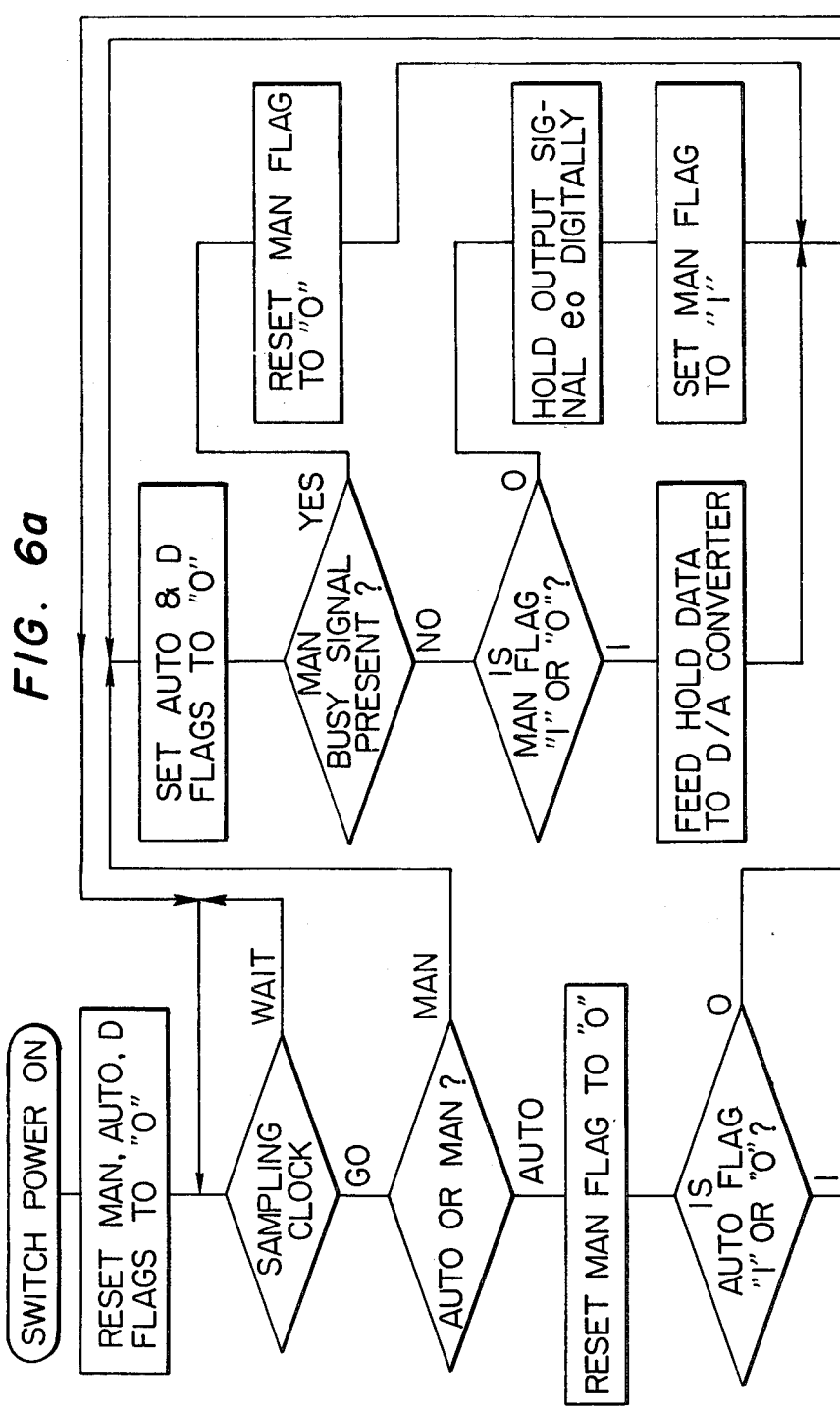

ELECTRIC CONTROLLER SYSTEM WITH BUMPLESS TRANSFER

BACKGROUND OF THE INVENTION

1. Field of the Invention

The present invention relates to an electric controller system using a processor such as a micro-computer, and more particularly to a system for controlling industrial process variables such as temperature, pressure and flow rate.

2. Description of the Prior Art

In associating a micro-computer and the like with an analog controller system, it is necessary in the conventional art to provide an analog/digital converter (hereinafter referred to as A/D converter) on the input side of the micro-computer for converting an analog signal to a digital signal and also a digital/analog converter (hereinafter referred to as D/A converter) on the output side for converting a digital signal to an analog signal. The A/D converter is expensive and has a complicated circuit configuration. Hence, if an A/D converter and a micro-computer are employed in an electric controller system, the entire system is complicated and expensive. Further, for manual control of an output signal, the usual practice is to provide a manual control means at the input of each processor to obtain a manual output through a memory in the processor, so as to transfer from automatic control to manual control or vice versa in a balanceless, bumpless manner while avoiding generation of a drift in the output signal during the manual control mode. In such a system, however, a disadvantage is that no manual output is obtainable when the processor fails.

SUMMARY OF THE INVENTION

The principal object of the present invention is to provide an improved electric controller system which requires no A/D converter on the input side of a processor, thereby achieving a simplified structure and low cost.

Another object of the invention is to provide an improved system capable of performing bumpless transfer between automatic control and manual control while further providing for a manual output even when the processor fails.

BRIEF DESCRIPTION OF THE DRAWINGS

FIG. 2 is an exterior view of the controller system shown in FIG. 1;

FIG. 3 is a time chart for explaining the operation of the system of FIG. 1;

FIG. 4 is a flow chart showing an example of a converting procedure whereby a processor converts an input analog signal to a digital signal;

FIG. 5 is a conceptional diagram of data written into a data memory in the processor;

FIGS. 6A and 6B are a flow chart showing an example of sequential operation of the processor;

DESCRIPTION OF THE PREFERRED EMBODIMENTS

Figure 1:
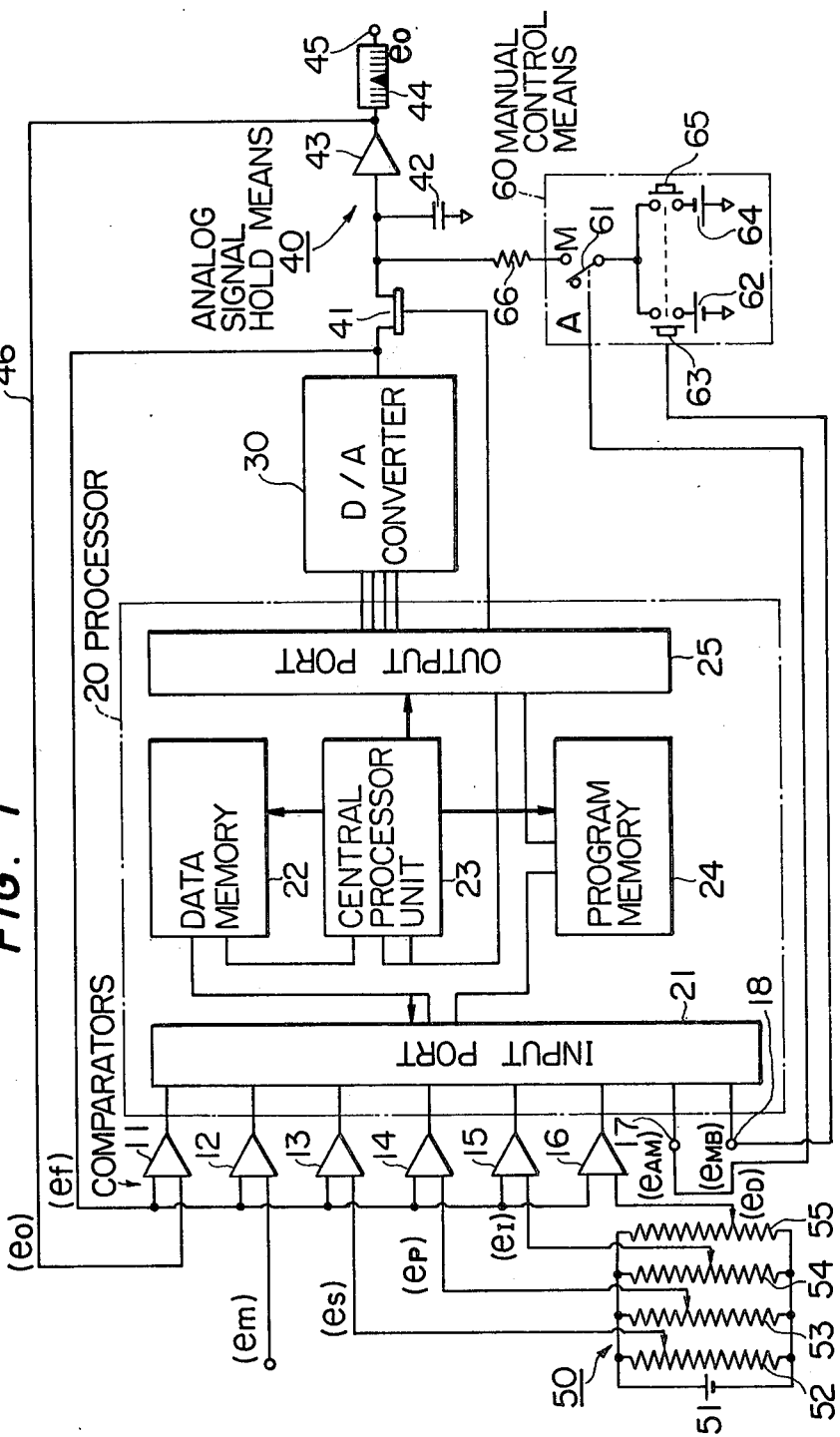
FIG. 1 is a block diagram of an exemplary controller system embodying the present invention.

In the block diagram of FIG. 1 showing an exemplary embodiment of the present invention, a processor 20 such as a micro-computer receives a signal from each of six comparators 11 through 16 and also the signals applied to the terminals 17 and 18 from a manual control means to be described. A D/A converter 30 converts the digital output signal from processor 20 to an analog signal and feeds the output to input terminals of comparators 11 through 16 in common. An analog signal hold means 40 such as a sample hold circuit, consists of a semiconductor switch 41, a capacitor 42 and an amplifier 43. An output 44 having an output terminal 45 is provided at the output of amplifier 43. A control parameter setting circuit 50 consists of a d-c power source 51, a variable resistor 52 connected thereto and serving to establish a set value $e_s$, a variable resistor 53 for setting a proportional constant (P), a variable resistor 54 for setting an integral constant (I), and a variable resistor 55 for setting a derivative constant (D). A manual control means 60 comprises an A/M selector switch 61 for transferring the system to automatic control or manual control, an incremental switch 63 connected to a positive power source 62, and a decremental switch 65 connected to a negative power source 64. The output terminal of this manual control means is connected to the input of the analog signal hold means 40 through a resistor 66.

The output signal $e_O$ of analog signal hold means 40 is applied through a leadwire 46 to one input terminal of comparator 11, which compares the signal $e_O$ with the analog signal $e_f$ applied to the other input terminal from the D/A converter 30 and then feeds the result of comparison as an input signal to the processor 20. In the same manner, the comparator 12 compares the process measurement signal $e_m$ received through one input terminal thereof with the analog signal $e_f$ from D/A converter 30. The comparators 13 through 16 receive set signals $e_S$, $e_p$, $e_I$ and $e_D$ individually from the control parameter setting circuit 50 and compare them with the analog signal $e_f$ from the D/A converter 30.

The processor 20 consists of an input port 21, a data memory 22 such as a read-write memory, a central processor unit 23, a program memory 24 such as a read-only memory, and output port 25. The input port 21 receives the output signals of comparators 11 through 16 and also the signal from the manual control means 60 applied through the terminals 17 and 18 and keeps the input signals therein until they are loaded by the signal from central processor unit 23. The data memory 22 temporarily stores the signal obtained from the input port 21 or stores the result of computation in response to the signal from central processor unit 23. The program memory 24 stores the computing program and the data required for computation and also the program required for control of analog signal hold means 40. The memory content is read out in response to a signal from the central processor unit 23. This central unit determines the state of the signal fed to the input port 21 and writes the signal state into the data memory 22, or decodes the computing procedure from the program memory 24, or performs digital computation by using the data read out from the program memory 24 or the signal obtained from the data memory 22.

The output port 25 receives the digital signal from data memory 22 or central processor unit 23 and feeds a digital signal to the D/A converter 30 in response to the signal obtained from the central processor unit 23. The D/A converter 30 converts the digital signal of the output port 25 to an anlog signal and feeds it to the terminals of comparators 11 through 16, and further applies this analog signal to the analog signal hold means 40 when the switch 41 is turned on by an output instruction signal from the processor 20.

In the exterior view of FIG. 2 showing an exemplary embodiment of the present invention, a vertical type meter 91 indicates a measurement value $e_m$ and a set value (target value) $e_S$. This meter is mounted substantially at the front center of the instrument, and its one pointer 92 indicates the measurement value $e_m$ while its other pointer 93 indicates the set value $e_S$. A set knob 94 may be used to establish the set value $e_S$. Rotating this knob moves the brush of a variable resistor 52 to increase or decrease $e_S$, and its value is indicated by the position of pointer 93. An output meter 44 for indicating the output signal is of the flat horizontal type in this embodiment. An A/M selector switch 61 is provided to select an automatic control mode at the left position or a manual control mode at the right position. A manual control lever 66 closes an incremental switch 63 in FIG. 1 when placed at the right position in the manual control mode or closes a decremental switch 65 when placed at the left position. Set screws 95, 96 and 97 are connected respectively to the brushes of variable resistors 53, 54, 55 and serve to establish P, I, D constants individually.

Now the operation of the system having the above mentioned structure will be described below with reference to the time chart of FIG. 3, the automatic control mode and the manual control mode being considered separately.

In FIG. 3, (a) is a measurement signal $e_m$, and (b) is a sampling clock signal for general control of the operation in the processor 20. The period t of this sampling clock signal is determined in consideration of the variation speed and so forth of the measurement value $e_m$. First, automatic control mode is obtained by placing the A/M selector switch 61 at the AUTO position on the left to disconnect the output terminal of manual control means 60 from the analog signal hold means 40. Then the signal representing the automatic control mode is applied to the terminal 17. In this mode, as shown in FIG. 3(c), the processor 20 loads the measurement signal $e_m$ applied to one input terminal of the comparator 12 at the rise of the first sampling clock pulse in accordance with the signal (program) stored in the program memory 24, and the measurement signal $e_m$ is converted to a digital signal by an analog/digital conversion loop consisting of comparator 12, processor 20 and D/A converter 30.

Among a variety of methods known for conversion of an input analog signal to a digital signal, there is, for example, sequential comparison in which conversion is performed as shown in the flow chart of FIG. 4. (1) The most significant bit in an A register in the central processor unit 23 is set to "1", so that the digital amount corresponding to 50 percent of the total capacity of the A register is set therein. (2) Subsequently, the content of the A register is fed to the D/A converter 30, so that the digital amount corresponding to said 50 percent is converted to an analog amount by the D/A converter 30, and the analog signal $e_f$ is applied to the other input terminal of comparator 12. (3) Then, the output signal of comparator 12 is loaded for discrimination of its state. (4) If the state of the signal thus loaded is "0" or $e_m < e_f$, the most significant bit of the A register, set to "1" initially, is reset to "0." And if the signal state is "1" or $e_m > e_f$, the most significant bit of the A register, set to "1" initially, is left unchanged. (5) The A register is checked to decide whether the above procedure has been followed for all the bits, and if it is not yet finished, (6) the next bit or the second bit weighted half to the most significant bit is set to "1." This completes setting of the digital signal corresponding to 25 percent or 75 percent of the total capacity in the content of A register. Here, the procedure returns to (2) again, and the steps from (2) to (6) are repeated in the same manner as the foregoing. This time, the third bit is set to "1" in the step (6). And in this way, the steps from (2) to (6) are executed continuously until all the bits of the A register are determined, that is, until the least significant bit is set to "1" or "0." The procedure is completed upon determination of all the bits, and the content remaining in the A register represents the value of the digital signal converted from the input analog signal $e_1$.

The digital signal thus obtained is written as a measurement value MEASn-2 in a portion of the data memory 22. Next, the processor 20 loads the output signal $e_0$ of analog signal hold means 40 through the comparator 11 at the rise of the second sampling clock pulse, and signal $e_0$ applied to one input terminal of the comparator 11 is converted to a digital signal in the same procedure as the foregoing by an analog-digital conversion loop consisting of the comparator 11, the processor 20 and the D/A converter 30. This digital signal is then written as an output value Eon-1 in a portion of the data memory 22. In the same manner, the processor 20 also loads the measurement signal $e_m$ and the set value $e_S$ fed individually to comparators 12 and 13 and, after A/D conversion, $e_m$ is written as MEASn-1 and $e_S$ and SETn-1, respectively, in portions of the data memory 22. At the rise of the third sampling clock pulse, the processor 20 loads the signals $e_m$, $e_S$, $e_P$, $e_I$ and $e_D$ fed individually to the comparators 12 through 16 through one input terminal thereof and performs A/D conversion. Then the converted values of $e_m$ and $e_S$ are written as MEASn and SETn in the data memory 22, and also the converted values of $e_P e_I$, $e_D$ are written therein as KP, KI, KD respectively.

FIG. 5 is a conceptional diagram showing storage of the data thus written in the data memory 22.

The processor 20 then excutes proportional plus integral plus derivative (PID) computation as shown in figure 3(d) by using the data stored in the data memory 22 or the data in the program memory 24 in accordance with the program stored in the program memory 24.

An example of computation executed here is represented by the following expression:

$$Eon = \frac{100}{KP} \{\epsilon n - \epsilon n - 1 + \frac{\Delta T}{KI} \cdot \epsilon n + \frac{KD}{\Delta T} (MEASn - 2 \ MEASn - 2)\} + Eon - 1$$

where
Eon: Output value of computation executed this time
Eon−3: Output value of preceding computation
$\epsilon n$ = MEASn − SETn
$\epsilon n - 1$ = MEASn−1 −1

Explanation of the specific procedure for such computation is omitted here.

Upon completion of the computation, the result Eon is fed to the D/A converter 30 through the output port 25 as shown in FIG. 3(e) and is converted to an analog signal. Subsequently, as shown in FIG. 3(f), an output instruction signal is fed to the sample hold switch 41 so that the analog signal from D/A converter 30 is applied to the analog signal hold means 40 through the switch 41. Thus, the result $e_O$ of computation in the form of an anlog signal such as shown in figure 3(g) can be obtained continuously from the output terminal 45. In this case, the analog signal from D/A converter 30 is applied also to the other input terminals of comparators 11 through 16, but it has no effect since the output signal of each comparator is not loaded in the processor 20. For the next computation, the processor 20 transfers MEASn-1 to MEASn-2, MEASn to MEASn-1, SETn to SETn-1, and the computation result Eon to Eon-1 respectively in the data memory 22. Subsequently, the signals $e_m$, $e_S$, $e_P$, $e_I$ and $e_D$ are received at each period of the sampling clock signal and the operation after the A/D conversion is repeated, so that the new result of computation is obtained in the form of a continuous analog from the output terminal 45.

Manual control mode is obtained by placing the A/M selector switch 61 at the MAN position on the right to connect the output terminal of manual control means 60 to the analog signal hold means 40. Then the signal representing the manual control mode is applied to the terminal 17, and simultaneously the output signal $e_{on}$ in the automatic control mode immediately prior to transfer to the manual control mode is held in the analog signal hold means 40. Consequently, such transfer of mode is performed bumplessly. In the manual control mode, when the manual control lever 66 is placed at its neutral position where neither the incremental switch 63 nor the decremental switch 65 is connected, a NOT BUSY signal representing nonactuated state of the manual control lever is applied therefrom to the processor 20 through the terminal 18. After loading this NOT BUSY signal, the processor 20 loads the output signal $e_{on}$ of analog signal hold circuit 40 and, after A/D conversion, holds the converted signal digitally in a portion of the data memory 22 in the processor 20. The value thus held is fed to the capacitor 42 through the D/A converter 30 so as to refresh the electrical quantity in the capacitor 42. Such operation is illustrated on the right of the time chart in FIG. 3. The above operation eliminates the influence of drift caused by leakage current and the like of the capacitor 42 in the state where no manual actuation is effected in the manual control mode, thereby preventing a change in the output signal even in the prolonged manual control.

In the manual control mode, the output signal $e_O$ can be handled manually by shifting the manual control lever 66 rightward or leftward to adjust the indication of the output meter 44 to a desired value. That is, when the incremental switch 63 or the decremental switch 65 is connected, the d-c power source 62 or 64 is connected to the capacitor 42 through the resistor 66 so that the voltage of capacitor 42 is increased or decreased at the time constant determined by the values of resistor 66 and capacitor 42. And by placing the manual control lever 66 at its neutral position when the indication of output meter 44 reaches the desired value, the increase or decrease of the output signal $e_O$ is brought to a stop and is held there, hence achieving manual control of the output signal $e_O$ to the desired value. When the manual control lever 66 is actuated, a BUSY signal is applied to the terminal 18 so that the refreshing action of processor 20 is interrupted. When the manual control lever 66 is returned to its neutral position, the processor 20 loads a NOT BUSY signal applied to the terminal 18, and then loads the final output signal in the manual actuation through comparator 11 according to the foregoing procedure in the manual control mode. And after A/D conversion, the processor continues the operation of holding the signal digitally and refreshing the electrical quantity in capacitor 42.

When the A/M selector switch 61 is then shifted to its AUTO position to select the automatic control mode, the signal representing the automatic control mode is applied to the terminal 17, and the processor 20 executes the aforementioned operation in the automatic control mode from the beginning. Here, in the proportional plus integral plus derivative (PID) computation, transfer from the manual control mode to the automatic control mode can be performed in a balanceless, bumpless manner since the final output signal (of analog signal hold means 40) in the manual control mode loaded prior to the computation is usable for the initial value of computation (Eon−1 in the expression) by the processor 20. Moreover, if the system is so constituted that the switch 41, for example, if turned off at the occurrence of interruption of power supply and output signal $e_O$ immediately prior to such power interruption is held in the analog signal hold means 40, then it becomes possible to load the output signal $e_O$ upon restoration of power supply and to use this signal for the initial value of computation. And thus the output signal preceding the power interruption is rendered obtainable continuously after restoration of power supply.

Figure 6B:
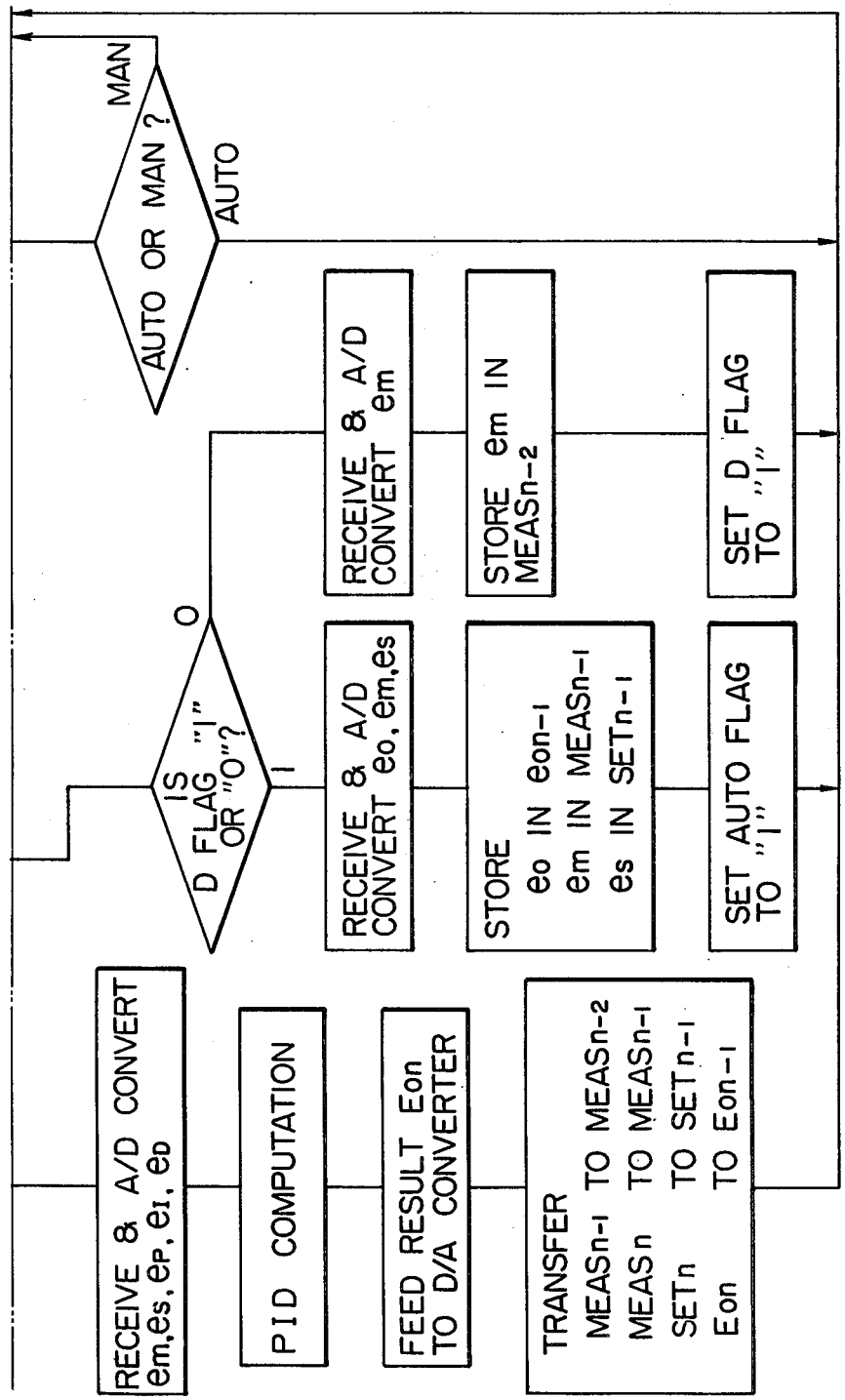

FIGS. 6A and B are a flow chart showing an example of the procedure for causing the processor 20 to execute the above sequential operation. Here, MAN, AUTO and D flags are provided for deciding the routes.

In the system of the present invention constructed as described above the processor performs time-sharing control on A/D conversion of each input analog signal, PID computation, and transmission of control signal (output instruction signal) to the analog signal hold means, hence eliminating the necessity of installing any expensive A/D converter on the input side of the processor and consequently simplifying the whole structure with reduction of the cost. Furthermore, by virtue of installing the manual control means on the output side of the processor, a manual output is obtainable in case the processor fails in normal operation, effecting balanceless, bumpless transfer from automatic control to manual control or vice versa.

FIGS. 7 through 9 and 11 are block diagrams of other examples embodying the present invention.

Figure 7:
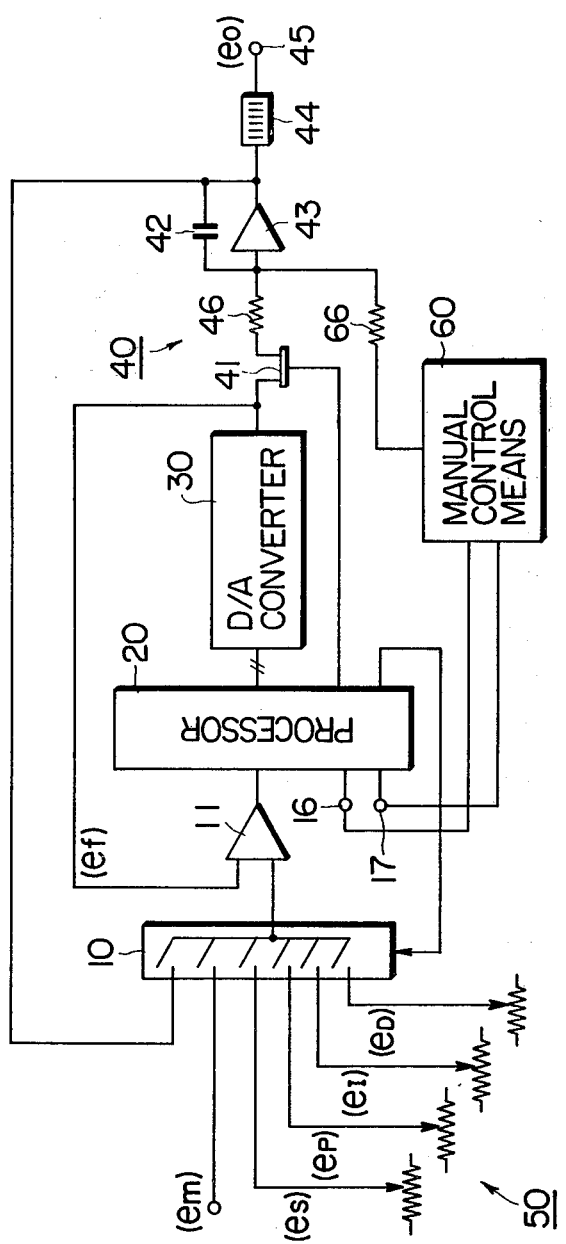
FIGS. 7 through 9, 11 and 14 are block diagrams of other embodiments of the invention.

In the embodiment of FIG. 7, a comparator 11 is installed on the input side of a processor 20, and a multiplexer 10 controlled by the output signal of processor 20 is installed on the input side of comparator 11. An analog signal hold means 40 consists of an integrator comprising an amplifier 43, a capacitor 42 connected between the input and output terminals of the amplifier and an input resistor 46. In this embodiment where a signal selected by the multiplexer 10 is fed through the comparator 11 to the processor 20, although the multiplexer 10 is necessary, merely a single comparator is sufficient. Therefore, it is remarkably effective in the case of dealing with multiple input analog signals.

Figure 8:
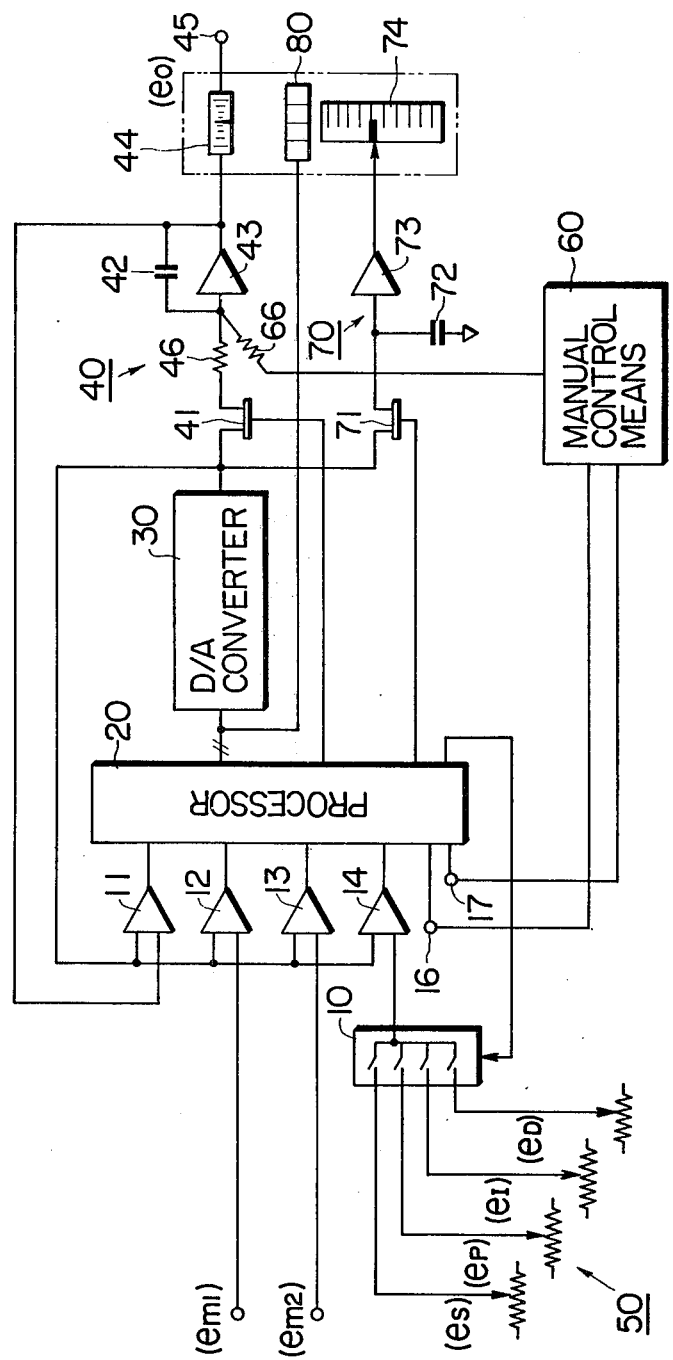

In the embodiment of FIG. 8, comparators 11 through 14 are installed on the input side of a processor 20, and a multiplexer 10 is installed on the input side of the comparator 14. Here, an output signal $e_O$ is applied to the comparator 11 as one input thereof; a first measurement signal $e_{m1}$ is applied to the comparator 12; a second measurement signal $e_{m2}$ is applied to the comparator 13; and $e_S$, $e_p$, $e_I$ or $e_D$, as selected by the multiplexer 10, is applied to the comparator 14. The output side of D/A converter 30 is equipped with an analog signal hold means 70 for holding the differential computation result (deviation) $\gamma n$ between the first measurement signal $e_{m1}$ and the set value (target value) $e_S$. A deviation meter 74 is also provided at the D/A converter output. Furthermore, a digital indicator 80 is installed on the output side of processor 20 so as to indicate the set value $e_S$ digitally. According to this embodiment, if the first measurement signal $e_{m1}$ is, for example, a flow rate signal affected by temperature, the second measurement signal may be used as a temperature signal, and PID computation is executed after correcting the flow rate signal by the temperature signal in the processor 20.

Figure 9:
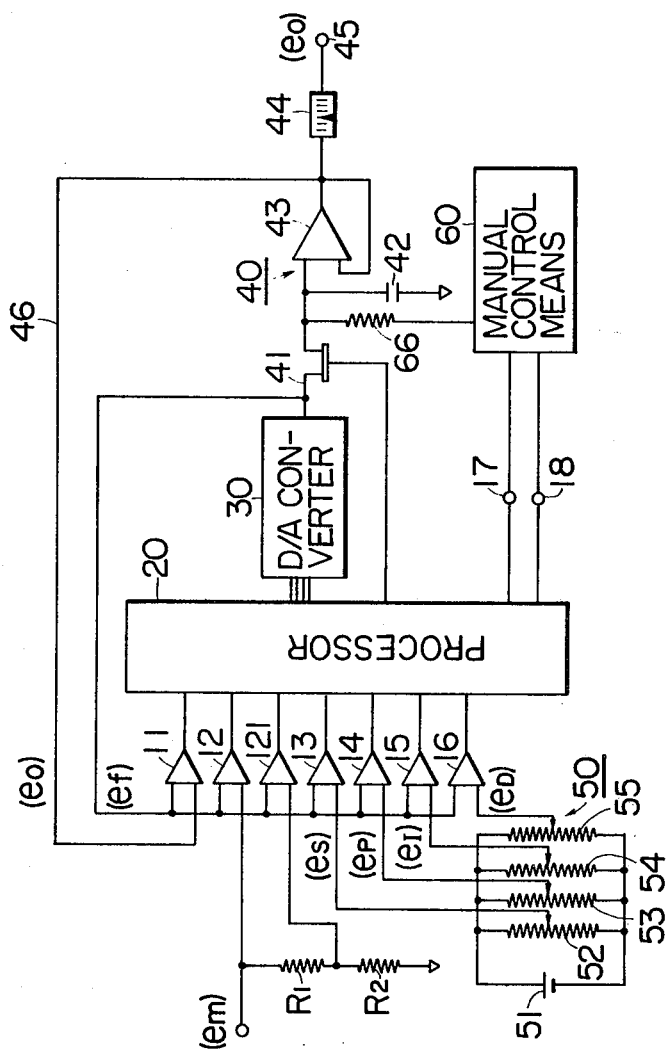

In the embodiment of FIG. 9, the input side of a processor 20 is equipped with a comparator 121 and also voltage-dividing resistance means R1 and R2 for dividing the voltage of a measurement signal $e_m$ so that a divided-voltage signal $e_m/n$ (in which n = (R2/R1 + R2)) obtained through the resistance means R1, Rs is applied to one input terminal of comparator 121. This provides the processor 20 with a self-checking function to determine whether it is performing normal operation or not. In checking the system operation, the processor 20 first receives the measurement signal $e_m$ applied to the comparator 12, and this signal is converted to a digital signal $E_m$ by an analog/digital conversion loop consisting of comparator 12, processor 20 and D/A converter 30. Subsequently, the processor 20 executes division, for example, by using the digital signal $E_m$ and $E_m/n$ thus obtained, so as to find the ratio between $E_m$ and $E_m/n$. Although the procedure for executing the computation to obtain the ratio depends on the content of the program, passage through various computing procedures is desirable for the purpose of inspecting various system functions. The result of such division becomes n or 1/n if the analog/digital conversion loop and the various computing functions are operating properly. Therefore, through discrimination of the result between n (or 1/n) and any other value, the processor 20 is capable of checking, over the entire range of the measurement signal $e_m$, the normal and abnormal conditions of the whole system including comparators 12 and 121, processor 20 and D/A converter 30.

Figure 10:
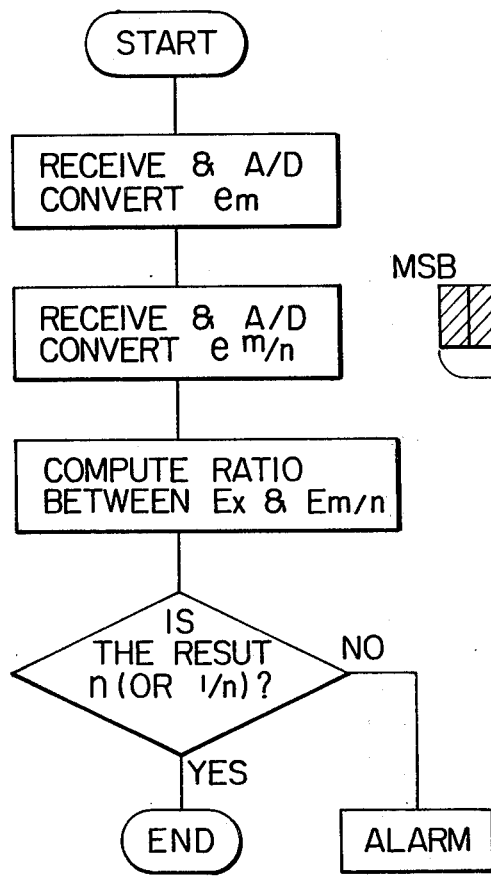
FIG. 10 is a flow chart showing an example of the operation of the embodiment illustrated in FIG. 9.

FIG. 10 is a flow chart showing the summary of a program to execute the above self-checking action.

Figure 13:
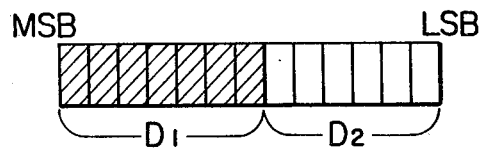
FIG. 13 is a conceptional diagram of a digital signal obtained through analog/digital conversion by the embodiment of FIG. 11.
Figure 12:
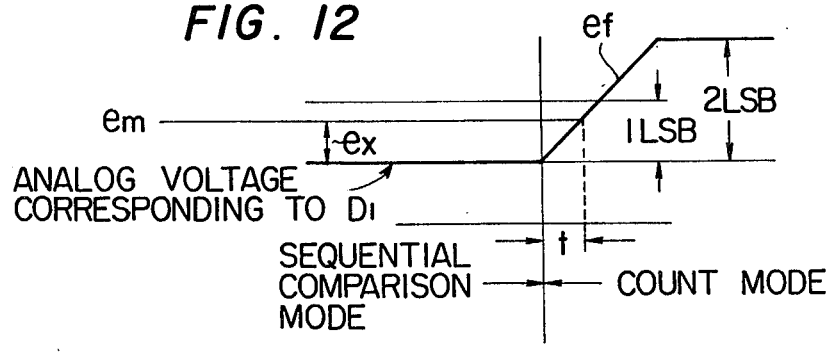
FIG. 12 plots the waveform representing the operation of the embodiment illustrated in FIG. 11.
Figure 11:
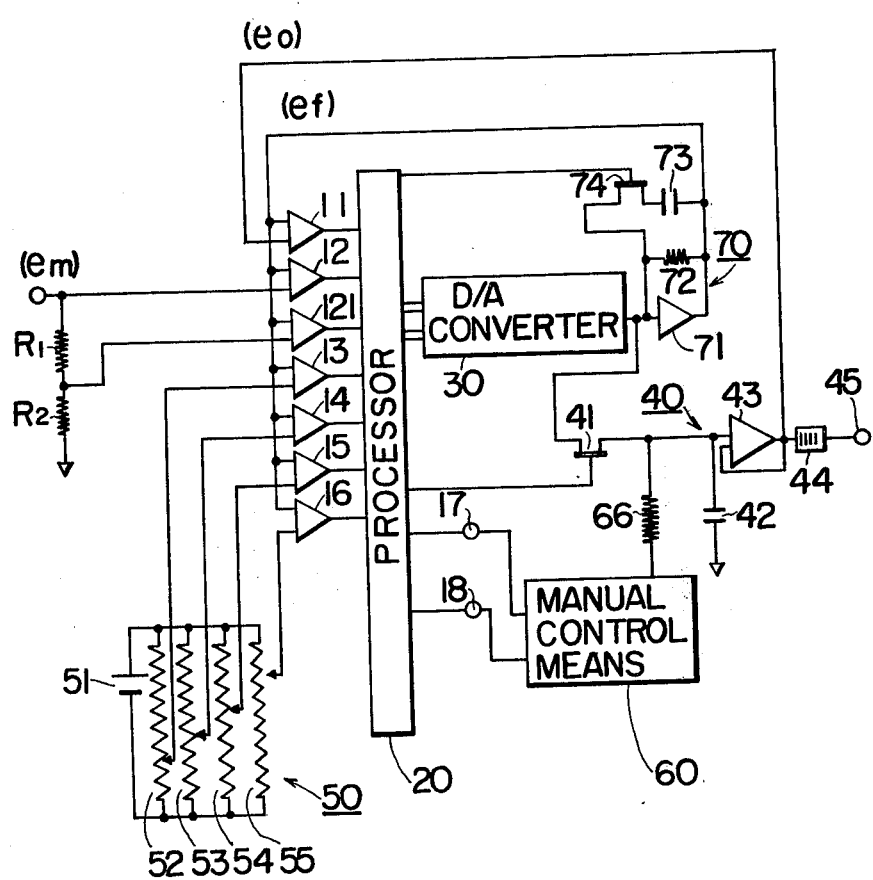

In the embodiment of FIG. 11, a slope signal generator 70 is connected to the output side of a D/A converter 30 so as to convert the stepped output signal of the D/A converter to a slope signal varying substantially linearly with the lapse of time, and the output terminal of this slope signal generator is connected to the other input terminals of comparators 11 through 16 in common, in an attempt to improve the resolution in converting the analog signal applied to one input terminal of each comparator to a digital signal. The D/A converter 30 employed here is of the current output type. And the slope signal generator 70 comprises an amplifier 71, a resistor 72 connected between the input and output terminals of the amplifier, and a series circuit of a capacitor 73 and a switch element 74. In this system, the processor 20 turns off the switch element 74 and executes A/D conversion first in a sequential comparison mode according to the procedure of FIG. 4 by a conversion loop consisting of a comparator, processor 20 and D/A converter 30, thereby obtaining in the processor a digital signal D1 of a resolution corresponding to the number of bits of D/A converter 30. Then, with the switch element 74 turned off, the processor 20 varies the output signal of D/A converter 30 by, for example, two LSB's (least significant bits). In accordance with the stepwise variation of the converter output, the output $e_f$ of the slope signal generator is turned into a slope signal varying linearly with the lapse of time, and the analog signal (e.g., measurement signal $e_m$) applied to one input terminal of the comparator is compared with the slope signal $e_f$. The processor 20 counts the time required until $e_m$ becomes equal to $e_f$ after the stepwise variation of the output signal of D/A converter 30, thereby obtaining a digital signal D2. That is, in the state where the slope signal is generated, the processor 20 executes A/D conversion in a count mode. As illustrated in FIG. 13, the digital signal D2 obtained in the count mode through generation of the slope signal is added to the digital signal obtained in the sequential comparison mode, and thus a digital signal corresponding to $e_m$ is produced. In this embodiment, the slope signal generator may be of some other circuit configuration. Moreover, the stepwise variation of the output signal of D/A converter 30 is not limited to two LSB's alone but may be any integral multiple of an LSB, and changing the polarity is also possible.

Figure 14:
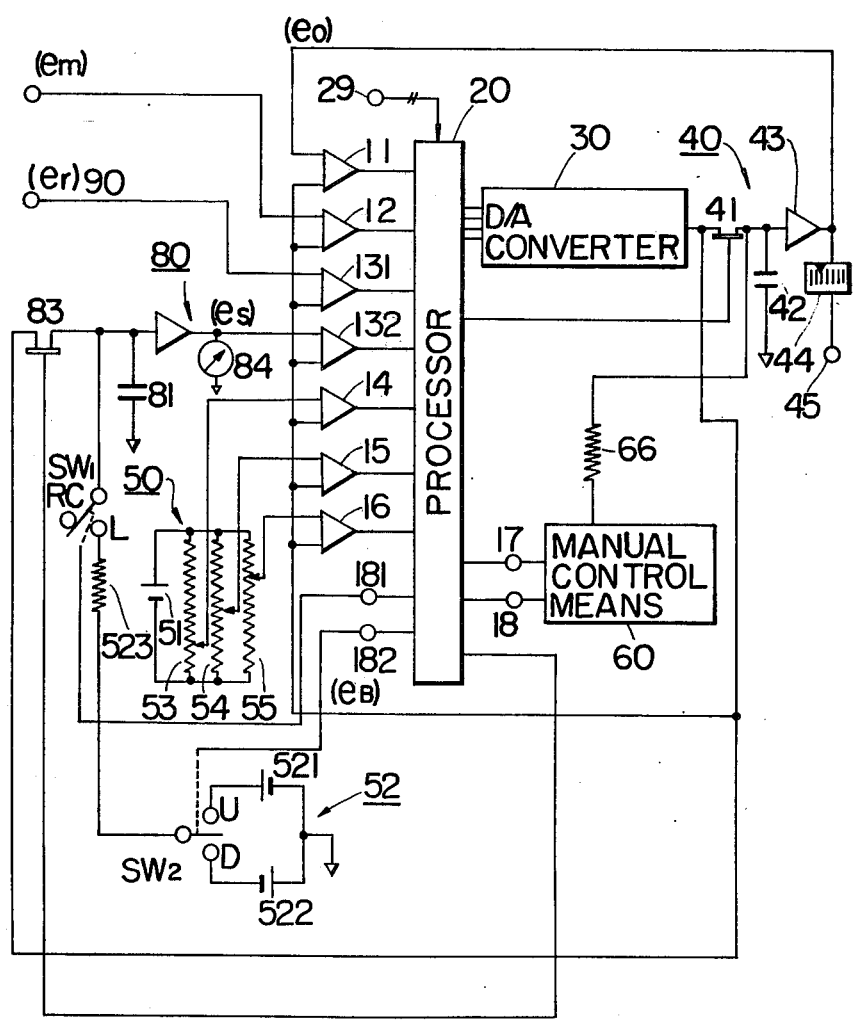

By means of the embodiment of FIG. 14 a set value (target value) can be established by an external signal as well. Transfer from remote setting to local setting is achievable in a balanceless, bumpless manner. A remote setting signal $e_r$ is applied to an input terminal 90. Means 80 serving to hold the setting signal comprises a capacitor 81, an amplifier 82, a switch element 83 driven by a signal from a processor 20, and an indicator 84. An R/L selector switch SW1 has a contact RC and a contact L for selecting remote setting or local setting. A local setting circuit 52 comprises a manual switch SW2 actuated manually and d-c power sources 521 and 522. The output terminal of this circuit is connected to the contact L of R/L selector switch SW1 through a resistor 523. The output signal of the D/A converter 30 is applied to the input terminal of setting signal hold means 80 through a switch element 83, and the output signal of local setting circuit 52 is also applied thereto through R/L selector switch SW1. A signal representing the position of R/L selector switch SW1 is applied to the processor 20 through a terminal 181, and a signal representing the actuated state or nonactuated state of manual switch SW2 is applied to the processor 20 through a terminal 182.

In this system, remote setting such as cascade setting is attained by closing the contact RC or R/L selector switch SW1. Then a signal representative of the remote setting state is applied through the terminal 181 to the processor 20, which loads synchronously the remote setting signal $e_r$ being applied to terminal 91 through a comparator 131 and, after A/D conversion, holds the signal digitally in a set point register formed in a portion of the data memory in the processor 20. The digital value thus held is used for computation and is further transmitted through the switch element 83 to the capacitor 81, where the signal is held in the form of analog value. Consequently, the output of setting signal hold means 80 follows the remote setting signal $e_r$ and becomes equivalent thereto.

Transfer from such a remote setting state to a local setting state is effected by closing the contact L of R/L selector switch SW1. Then a signal representative of the local setting state is applied through the terminal 181 to the processor 20, which now loads the output signal of a comparator 132 synchronously. The remote setting signal immediately before transfer to the local setting state is held in the capacitor 81 of setting signal hold means 80, hence achieving bumpless transfer from the remote setting state to the local setting state.

When the manual switch SW2 is at its nonactuated position in the local setting state, a NOT BUSY signal is applied to the processor 20 through the terminal 182. Upon reception of this signal, the processor 20 feeds the digital value, which is held in the set point register, to the capacitor 81 through the D/A converter 30 and the switch element 83, so as to refresh the electrical quantity in the capacitor 81. This operation eliminates the influence of drift caused by the leakage current of capacitor 81 when the manual switch SW2 is not actuated in the local setting state, thereby preventing a change in the output value of setting signal hold means 80 even in the prolonged local setting state. The set value is changeable by closing the contact U or D of manual switch SW2 in the local setting circuit 52 and adjusting the indicator 84 until its indication reaches a desired value. When the manual switch SW2 is at its actuated position, a BUSY signal is applied to the processor 20 to interrupt the said refreshing action, so that a digital signal corresponding to the indicated value of indicator 84 is held in the set point register.

The setting of a target value according to an external computer is accomplished by changing the content of the set point register in the processor 20 through terminal 29 when the contact RC of R/L selector switch SW1 is closed. Transfer from computer setting to local setting can be achieved bumplessly as in the transfer from remote setting to local setting.

If the switch element 83, example, is turned off at the occurrence of interruption of the power supply and the set value (corresponding to the content of set point register) immediately prior to such power interruption is held in the capacitor 81 of setting signal hold means 80, then it becomes possible to feed this set value to the processor 20 continuously after restoration of the power supply.

Each of the foregoing embodiments may be so modified as to obtain the result of PID computation in the form of a digital signal from the processor 20. Moreover, in each embodiment where the set value $e_S$ and the PID computation constants are fed in the form of analog signal, any one or all of them may be fed from a digital set unit. Furthermore, in addition to the aforementioned example of a control parameter setting circuit which establishes the set value $e_S$ and the PID constants, it is also possible to provide, if necessary, various parameters such as upper and lower limit alarm values for the measurement signal, upper and lower limit values for the output signal and so forth. And in a further modification, these control parameters may be set or changed directly by external signals from a computer or the like installed outside.

Thus, as mentioned hereinabove, the present invention makes it possible to implement an improved electric controller system of a simplified structure capable of performing balanceless-bumpless transfer from automatic control to control or vice versa.

We claim:
1. An electric controller system comprising:
   comparator means;
   means for feeding a measurement signal to an input of said comparator means;
   a processor having an input coupled to said comparator means and including means arranged to (a) convert signals received from said comparator means to corresponding digital input signals, (b) perform digital operations on such digital input signals to produce corresponding digital output signals; and (c) develop a control output signal; said processor performing said analog-to-digital conversion and said digital operations respectively during first and second parts of each of successive operating cycles;
   a digital/analog converter for converting said digital output signals of said processor to analog output signals;
   circuit means coupling said analog output signal of said digital/analog converter to a second input of said comparator means;
   an analog signal hold means coupled to the output of said digital/analog converter to hold the output thereof;
   means responsive to said processor control signal for activating said hold means;
   manual control means connected to the input of said analog signal hold means;
   means operable to switch said manual control means into manual control mode wherein said manual control means is enabled to control the signal held by said analog signal hold means;
   means for feeding the output signal of said analog signal hold means to a third input of said comparator means;
   whereby in manual mode said processor can develop digital output signals responsive to said output signal of said analog signal hold means.

2. The electric controller system as defined in claim 1 wherein said manual control means is operable only in a manual control mode and, within said manual control mode, said manual control means is in either a manually actuated or a nonactuated state,
   said manual control means comprising means for feeding to said processor an output signal indicating that said electric controller system is in a manual control mode and means for feeding to said processor a separate output signal indicating whether said manual control means is in a manually actuated or a nonactuated state, and
   said processor comprising means for holding the output signal of the analog signal hold means digitally during a manually nonactuated state in the manual control mode.

3. The electric controller system as defined in claim 1, wherein the analog signal hold means comprises means for holding the output thereof even with interruption of the power supply, and the processor comprises means for loading the output signal of the analog signal hold means after restoration of the power supply.

4. The electric controller system as defined in claim 1, further comprising a multiplexer at the input of the comparator means and controlled by an output signal of the processor to feed to the comparator means one of a plurality of input signals.

5. The electric controller system as defined in claim 1, wherein the analog signal hold means comprises an integrator.

6. The electric controller system as defined in claim 1, comprising a plurality of analog signal hold means, the processor being arranged to feed the results of computation sequentially or selectively to said analog signal hold means.

7. The electric controller system as defined in claim 1, wherein at least one control parameter is set in the form of an analog signal, and said parameter is fed to the processor through the comparator means.

8. The electric controller system as defined in claim 1, further comprising voltage-dividing resistance means for dividing the voltage of a measurement signal, the processor comprising being arranged to convert both the measurement signal and the divided-voltage signal to digital signals and being arranged to compared the result of a computation of the ratio between said two signals with the value related to the voltage division ratio of said resistance means, thereby self-checking the system operation.

9. The electric controller system as defined in claim 1, further comprising a slope signal generator connected to the output of the digital/analog converter for converting, in response to a signal from the processor, a stepped output signal of the digital/analog converter to a slope signal varying substantially linearly with the lapse of time, and means connecting the output terminal of said slope signal generator to an input terminal of the comparator for improving the resolution in the analog-to-digital conversion.

10. The electric controller system as defined in claim 1, further comprising a local parameter setting circuit for generating a local setting signal, and a setting signal hold means connected to the output of the digital-/analog converter through a switch element;

the processor being arranged in a remote setting state for loading a remote setting signal through the comparator means and feeding a corresponding digital signal to said setting signal hold means through the digital/analog converter and the switch element; and means in a local setting state for loading the output signal of said setting signal hold means through the comparator means and feeding the local setting signal to the input side of said setting signal hold means.

* * * * *